United States Patent
Denvir et al.

(10) Patent No.: US 6,171,625 B1
(45) Date of Patent: *Jan. 9, 2001

(54) METHOD OF FOOD DECONTAMINATION BY TREATMENT WITH OZONE

(75) Inventors: Adrian J. Denvir, College Station; K. Scott McKenzie, Bryan; Thomas D. Rogers, Wheelock; Douglas R. Miller, College Station; G. Duncan Hitchens, Bryan; Craig C. Andrews, College Station, all of TX (US)

(73) Assignee: Lynntech, Inc., College Station, TX (US)

( * ) Notice: Under 35 U.S.C. 154(b), the term of this patent shall be extended for 0 days.

This patent is subject to a terminal disclaimer.

(21) Appl. No.: 09/518,011

(22) Filed: Mar. 2, 2000

Related U.S. Application Data

(63) Continuation of application No. 09/018,614, filed on Feb. 4, 1998.

(51) Int. Cl.[7] .............................. A23B 7/14; A23L 3/3409
(52) U.S. Cl. .................... 426/320; 426/321; 426/331; 426/335; 426/532
(58) Field of Search ...................... 426/312, 320, 426/321, 331, 332, 333, 335, 532

(56) References Cited

U.S. PATENT DOCUMENTS

| | | |
|---|---|---|
| 2,339,507 | 1/1944 | Nagy et al. . |
| 2,635,051 | 4/1953 | Di Giacinto et al. . |
| 3,341,280 | 9/1967 | Bolkin . |
| 3,592,641 | 7/1971 | Rayner et al. . |
| 4,335,148 | 6/1982 | Vidal et al. . |
| 4,350,709 | 9/1982 | Vidal et al. . |
| 4,421,774 | 12/1983 | Vidal et al. . |
| 4,549,477 | 10/1985 | McCabe . |
| 4,795,651 | 1/1989 | Henderson et al. . |
| 5,011,699 | 4/1991 | Mitsuda et al. . |
| 5,165,946 | 11/1992 | Taylor et al. . |
| 5,227,184 | 7/1993 | Hurst . |
| 5,230,160 | 7/1993 | Gross et al. . |
| 5,403,602 | 4/1995 | Endico . |
| 5,460,705 | 10/1995 | Murphy et al. . |
| 5,498,431 | 3/1996 | Lindner . |
| 5,635,039 | 6/1997 | Cisar et al. . |
| 5,783,242 | 7/1998 | Teague . |

FOREIGN PATENT DOCUMENTS

| | | |
|---|---|---|
| 32090930 | 9/1983 | (DE) . |
| 02224946 | 8/1990 | (JP) . |
| 04346800 | 12/1992 | (JP) . |

OTHER PUBLICATIONS

Derwent. Multipurpose Fresh Keeping Machine, 1 page.
Chatterje et al "Destruction of Phagocytosis–supressing activity of Aflatoxin B1 by Ozone" Letter in Applied Microbiology, vol. 17 pp. 52–54.
McKenzie et al., "Oxidative Degradation adn Detoxification of Mycotoxins using a Novel Sourse of Ozone", Food and Chemical Toxicology, vol. 35, pp. 807–830.
Young J.C. "Reduction in Levels of Doxynivalenol In Contaminated Corn by Chemcial and Phycical Treatment", J. Agric. Food Chem. vol. 34, pp. 465–467.
Maeba, et al "Destruction and Detoxification of Aflatoxins with Ozone", Journal of Food Science, vol. 53 (2) pp. 667–668.

Primary Examiner—Milton Cano
(74) Attorney, Agent, or Firm—Streets & Steele; Jeffrey Streets

(57) ABSTRACT

The present invention provides a system for the decontamination of agricultural products by reacting the toxins and microorganisms, contaminating the product, with ozone. The ozone is generated on site and upon demand, thus eliminating ozone waste associated with long periods of ozone storage. The systems of the invention provide efficient, safe, and environmentally friendly use of ozone for product decontamination by optimizing the delivery of ozone to the contaminated product, monitoring and controlling the pressure in the treatment systems, monitoring and controlling the heat generated during the treatment of contaminated product with ozone, and controlling ozone release into the atmosphere.

17 Claims, 4 Drawing Sheets

METHOD OF FOOD DECONTAMINATION BY TREATMENT WITH OZONE

This application is a continuation of U.S. patent application Ser. No. 09/018,614 filed on Feb. 4, 1998.

This invention was made with government support under grant 95-33610-1429 awarded by the United States Department of Agriculture (USDA). The government has certain rights in this invention.

BACKGROUND OF THE INVENTION

1. Field of the Invention

The present invention relates to techniques and devices for the decontamination and preservation of food products exposed to spoiling microorganisms and/or toxins. The invention more particularly relates to the use of ozone in the detoxification of agricultural products contaminated with mycotoxins.

2. Background of the Related Art

Mycotoxins are naturally occurring chemical compounds produced by certain species of fungi (e.g. Aspergillus sp., Fusarium sp., Penicillium sp.) which commonly grow on and infest plant materials such as grains, oilseeds and grasses. They are most often produced in the field under conditions of environmental stress on the plant (e.g. heat, insects, and drought). Aflatoxins are prevalent mycotoxins that present remarkable toxicity and hepatocarcinogenicity, that is, aflatoxins can cause diverse toxic effects on virtually all organs, eventually leading to the development of cancerous tumors capable of spreading throughout the entire body. There are four major aflatoxins ($AfB_1$, $AfB_2$, $AfG_1$ and $AfG_2$) that contaminate crops, with aflatoxins $AfB_1$ and $AfG_1$ having greater toxic potential than aflatoxins $AfB_2$ and $AfG_2$. The International Agency for Research on Cancer has particularly noted the major forms, $AfB_1$ and $AfG_1$, as potent carcinogens, linked primarily to cancer of the liver. Thus, the amount of aflatoxin allowed in human and animal food is regulated by state and federal agencies.

Fumonisin $B_1$ is a mycotoxin that occurs almost exclusively on corn and can cause toxic effects in horses and swine. fumonisin $B_1$ has been linked to esophageal cancer in humans and has been shown to be a cancer initiator and promoter in rodents. Tricothecenes (e.g. T-2 toxin, deoxynivalenol or 'vomitoxin'), ergot, zearalenone, cyclopiazonic acid, patulin, ochratoxin A, and secalonic acid D are mycotoxins that can negatively impact human and animal health due to their diverse toxic effects. The toxic effects caused by these mycotoxins may be classified as acute or chronic, depending on the level and duration of mycotoxin exposure and species sensitivity.

Virtually all animals in the food chain can be affected by exposure to contaminated food and feed, including humans, who can be exposed directly to toxins through grain handling and consumption or indirectly through consumption of an unmetabolized parent compound or toxic metabolic products in contaminated meat or livestock products (e.g. milk and cheese.) As a result, mycotoxin contamination of agricultural commodities, such as corn, wheat, rye, rice, barley, oats, peanuts, pecans, soybeans, cottonseed, apples, grapes, alfalfa, clover, sorghum, and fescue grass forages, can result in severe economic loss at all levels of food production (e.g. cost of pre-harvest prevention, post-harvest treatment, down-grading, loss of contaminated grain, decreased animal productivity and increased loss of livestock, health care costs, etc.) Thus, a need has long been recognized for techniques, methods, and devices that would help reduce the levels of multiple mycotoxins in feeds for livestock and food for human consumption.

In U.S. Pat. No. 4,421,774, Vidal et al. disclose a method for preventing sprouting and mold and fungi proliferation in stored grain having moisture content in excess of 15%. The disclosed energy intensive methods of stored grain preservation include heating the grain and reducing the moisture content to below 15%. Treatment with 1% propionic acid has also been shown to prevent microbial growth, however, the color texture and taste of the grain may be affected and thus grain treated by the methods disclosed by Vidal et al. can only be used in the treatment of animal feed.

Vidal et al. also disclose a method wherein sulfur dioxide gas is bubbled through a propionic acid solution. The gas is used to transport the vapor pressure qualities of the acid to the grain mass. After a given period of time, the grain is perfused with ammonia gas. The process is designed to prevent the formation of A. flavus (a fungus) during storage, thus preventing the formation of mycotoxins. However, the process is not capable of removing aflatoxins that are present on the grains before being placed in storage.

In U.S. Pat. No. 4,035,518, Carmona et al. disclose a method particularly adapted for the treatment of nuts contaminated with aflatoxins. The nuts are placed in a 0.10% sodium hydroxide solution at a temperature of 212° F. for 10 minutes. The nuts are then removed and washed in water until a neutral pH is attained. During this washing, the skins of the nuts are loosened by the sodium hydroxide and washed away allowing for color differentiation between the lightly colored uncontaminated peanuts and the deep dark contaminated peanuts. The color differences allow the contaminated and uncontaminated nuts to be sorted electronically. However, this process does not allow detoxification of the food contaminated with aflatoxins.

In U.S. Pat. No. 4,795,651, Henderson et al. use a flotation method to separate the contaminated grains or kernels. The authors describe methods that can be used to reduce the amount of aflatoxin contaminated material from feeds by physically removing them. The contaminated seeds rise to the top in a flotation medium while the uncontaminated seeds sink to the bottom. These processes present at least two drawbacks: 1) the high cost of removing and disposing of the contaminated materials in accordance with environmental guidelines, and 2) the difficulty of achieving complete removal of the contaminated kernels, seeds, etc. without wasting significant portions of the uncontaminated product.

Another method of removing mycotoxins is by altering them chemically by structural degradation following chemical treatment, or by physical absorption onto a reactive substrate. In U.S. Pat. No. 5,230,160, Gross et al. use microwaves and an applied vacuum to extract oil and moisture from seeds and nuts. The disclosed methods are designed as conventional continuous-type processes for the treatment of contaminated nuts. The contaminated food passes through a vacuum chamber where the microwaves are applied. The methods are based on the assumption that oil and water vapor fractions absorb the aflatoxins thus removing them from the food matrix. The water/oil/aflatoxin vapor is then condensed and removed. The aflatoxins can then be decontaminated before the mixture is discharged. One caveat presented by this technique is the need for extraordinary caution not to overheat the foods which necessitates that the microwave power be decreased incrementally along the chamber. Also, the heating process does not successfully destroy the aflatoxins (aflatoxins are relatively heat stable) nor does the treatment with microwaves.

In U.S. Pat. No. 5,165,946, Taylor et al. describe an inorganic animal food additive that chemically binds to and inactivates aflatoxins by combination in the gastrointestinal tract of the animal. A phyllosilicate clay is produced in pellet form and fed to livestock along with the mycotoxin contaminated meal. The aflatoxin binds to the clay during digestion and is excreted in the feces of the animal.

In U.S. Pat. No. 5,498,431, Lindner describes a method of detoxifying mycotoxins by an energy intensive process. Timed or untimed pulses of ultrasonic radiation are passed through an aqueous solution containing a suspension of grains or ground meal. In some cases, addition of alcohols, dilute acids and ammonia water to the aqueous suspension has been found to be somewhat beneficial. The radicals that are produced by the microcavition reaction attack the epoxide region of the various trichothecene mycotoxin molecules.

Treatment of grain with ammonia gas or ammonium hydroxide liquid has been found to reduce aflatoxin levels in corn, peanut meal, whole cottonseed and cottonseed products. Two procedures have been used in the ammoniation process: (1) High Temperature/High Pressure treatment, (HP/HT), and (2) Atmospheric Pressure/Ambient Temperature treatment, (AP/AT). HP/HT procedures involve the treatment of the contaminated product with anhydrous ammonia and water in a sealed vessel. The quantity of ammonia used in the treatment may vary between 0.5 and 2.0% while the moisture content is generally maintained between 12 and 16%. This treatment is maintained for up to one (1) hour at temperatures between 80 and 120° C. and pressures around 50 psi. In the AP/AT process, a 13% ammonium hydroxide solution is sprayed onto the contaminated product as it is being packaged into a plastic silage bag. The bag is then sealed and held at ambient temperatures for between 14 and 42 days. The bag is generally probed and tested periodically for aflatoxin levels. Other methods of introducing ammonia to the contaminated products include using monomethylamine and lime in the HP/HT process or liberating ammonia using urea.

Ozone ($O_3$) gas has been used for the sterilization and preservation of food and has recently been granted GRAS (Generally Recognized As Safe) status by the Food and Drug Administration.

Ozone is a highly reactive compound having a half life in air of only 24 hours. Ozone tends to react spontaneously and decompose according to the following reaction:

$$2O_3 \rightarrow 3O_2$$

Ozone's high reactivity introduces numerous problems. For example, ozone decomposition is easily accelerated by water, nearly all types of organic chemicals, and many types of inorganic chemicals. Ozone is also a surface active material, i.e. ozone decomposition is accelerated when ozone comes in contact with a surface, especially if the surface is organic in nature. Furthermore, ozone decomposition is accelerated at higher temperatures and pressures, by turbulence, ultrasound and ultraviolet light. Thus, unlike most conventional gases, ozone is not suitable for storage for more than a short period of time.

Where an ozone bearing gas is introduced into stored materials such as cereals, fruits, grasses, nuts and grains or other agricultural products, the ozone bearing gas may pass through the space between the grains of the material and displace air from the space around the material. Because of the generally organic nature of the stored materials and the high surface contact area of the grains, ozone may rapidly react and decompose into oxygen as it is being passed through this type of matrix. Therefore, it is generally difficult to maintain steady ozone concentrations in the interstices of the material to ensure adequate and uniform treatment of all the material in a storage container.

Ozone's high reactivity poses special problems when attempting to introduce and pass ozone though a porous organic medium such as agriculturally derived substances. In particular, special consideration must be given to controlling the dosing rate and achieving adequately high ozone concentrations uniformly throughout the entire stock of the stored material.

Uniform distribution of the ozone gas through the treated material may be complicated by multiple factors. For example, ozone reactivity may be so vigorous that when an ozone bearing gas is introduced into spaces around a material like grain or cereal, ozone may react immediately in the vicinity of the gas entry port resulting in excessive heating and accelerated ozone decomposition into oxygen in the immediate vicinity of the entry port. Furthermore, the ozone entry port may be overdosed with ozone, while grains located away from the entry port may have limited exposure to the ozone bearing gas. Furthermore, excess heating, which is more likely to occur at or near the entry port, may present significant hazard such as explosion of the container and/or fire.

Another important consideration in designing systems for detoxification by ozone treatment relates to the high cost of ozone generation. Decontamination by ozone treatment may only be cost effective if ozone waste is minimized.

In U.S. Pat. No. 3,341,280, Eolkin describes a method of using ozone and other gaseous compounds as a sterilizing gas for batch treatments of food. The chamber containing the food is evacuated, filled with sterilizing gas, and after a given period of time, the system is evacuated again to remove the sterilizing gas. However these systems present two major caveats: 1) heavy duty gauge material is always required in order to support the changes in pressure within the container and 2) almost unavoidable loss of the treatment gas to the atmosphere when the system is vented.

In U.S. Pat. No. 3,592,641, Rayner et al. describe a method of detoxifying aflatoxins in oilseed meals using ozone gas. Distilled water is added to ground meal to form a slurry with 22% to 30% water content. The mixture is then stirred and heated to a temperature between 75° and 100° C. and gassed with 25 mg/min $O_3$ for 60 to 120 min. The ozonated slurry is spread in a thin layer and air dried for 48 hours. While the technique allowed some decrease in aflatoxin contamination, its effective implementation in enhancing the nutritional and toxicological qualities of the ozonated meal is drastically limited by the necessity to heat the mixture, which dramatically increases the rate of decomposition of ozone into molecular oxygen prior to ozone's reaction with the aflatoxin molecule.

In U.S. Pat. No. 4,549,477, McCabe describes the use of ozone in a continuous treatment ozone based process for the preservation of food products. The food products are conveyed along an elongated housing structure filled with ozone on a series of conveyor units. Ozone gas is distributed at spaced locations along the conveyor belt so that ozone may continually displace air or oxygen present in the chamber. Because ozone is denser than both air and oxygen it acts as a blanket with limited diffusion away from the food. The disclosed system suffers several limitations including the need for the storage of large quantities of ozone, as well the potential for ozone waste and release into the atmosphere.

In U.S. Pat. No. 5,011,699, Mitsuda et al. disclose a method wherein ozone gas is mixed with an inert gas such as carbon dioxide or nitrogen to act as food sterilizer. The carbon dioxide gas may help the ozone penetrate inside the food stuff being treated, and nitrogen gas may help prevent the food stuff from changing color and from emitting offensive odors associated with excessive oxidation. The disclosed technique, however, suffers from the same limitations as the ozone treatment systems discussed above, and does not provide for controlled supply and release of the ozone.

In U.S. Pat. No. 5,403,602, Endico uses ozonated water to act as an oxidizing agent in the treatment of food with ozone. An oxygen sensor is used to monitor the increase in oxygen gas resulting from the decomposition of the ozone.

Thus, there is a need for ozone treatment systems, methods or devices that would partially or totally eliminate the need for storing ozone prior to its use in treating contaminated materials. It would also be desirable to provide improved systems of the introducing and distributing ozone through the contaminated material so that the contaminated material is uniformly exposed to the ozone. Furthermore, it would be desirable if the system prevented overheating and pressure buildup, made optimum use of ozone, and reduced or eliminated ozone waste and transfer to the environment. More particularly, it would be desirable to have a system that would provide better ozone treatment of dry contaminated material.

SUMMARY OF THE INVENTION

The present invention provides a method for treating agricultural products with ozone gas comprising: (a) placing the agricultural product in a treatment chamber; (b) generating ozone in the vicinity of the chamber; (c) supplying ozone to the product through an ozone delivery system in communication with the chamber having ozone delivery ports paired to ozone exit ports in the chamber, the pairing of the zone delivery ports and the ozone exit ports creating a plurality of ozone flow paths through the product; and (d) contacting the agricultural product with the ozone. The contacting of the agricultural product with the ozone preferably comprises reacting the ozone with the toxins and/or microorganisms in the agricultural product. The (c) and (d) steps of the method may be conducted simultaneously or sequentially.

The method encompasses ozone treatment of agricultural product comprising one or more toxins from the group consisting of aflatoxins, fumonisin $B_1$, ergot, zearalenone, cyclopiazonic acid, patulin, tricothecenes, ochratoxin A, and secalonic acid D.

The method may further comprise monitoring the temperature in the chamber and suspending ozone supply to the chamber when the temperature reaches a given value. The method may also comprise monitoring and controlling the concentration of ozone in the chamber and destroying the ozone exiting the treatment chamber.

The method of the invention encompasses controlling ozone delivery to particular sections of the chamber by selective closing of one or more sets of paired ozone entry and exit ports. Pressure sensors may be placed in the chamber near ozone exit ports to monitor and control the pressure inside the chamber. In particular, a selected set of paired ozone entry and exit ports may be opened or closed to control the pressure in the chamber. The chamber may also be communicated with one or more temperature sensors placed near the ozone entry ports, and ozone supply to the chamber through an ozone entry port may be suspended when the temperature near the entry port is higher than a given value. Further, The chamber may be communicated with one or more ozone sensors placed in the chamber near ozone exit ports and paired ozone entry and exit ports may be opened or closed to control the ozone concentration in the chamber.

The ozone used in the methods of the invention may be generated by a corona discharge process or by an electrochemical process. The ozone may be humidified before it is supplied to the chamber with or without mixing with a compressed inert gas.

The invention also encompasses supplying the ozone to the chamber through an ozone delivery system comprising a hollow tube with perforated holes in communication with an ozone generator. The hollow tube may be rotated to better distribute the ozone through the agricultural product in the chamber. The tube may also comprise wings extending from the surface of the tube and facing upwards towards the top of the chamber; the wings allowing lifting the agricultural product when the tube is rotated. The ozone may also be supplied by communicating the chamber with an ozone delivery system comprising a manifold in communication with an ozone generator and ozone entry ports in the chamber. Supplying the ozone to the chamber may also be accomplished by communicating the chamber with an ozone delivery system comprising a blower in communication with an ozone generator and the chamber.

The agricultural product treated by the methods of the invention may be placed in one or more chambers in communication with a common ozone source.

The invention also encompasses an apparatus for the supply of ozone gas to a matrix of product comprising: an ozone generator; a treatment chamber having a plurality of gas exit ports; an ozone delivery system in communication with the ozone generator having a plurality of gas entry ports paired with the gas exit ports in the chamber; a plurality of pressure sensors in communication with the treatment chamber positioned near the gas exit ports; and a plurality of temperature sensors in communication with the treatment chamber positioned near the gas entry ports.

The ozone delivery system of the invention may comprise a manifold in communication with the ozone generator and the plurality of gas entry ports; a blower in communication with the ozone generator and the chamber; and/or a hollow tube extending along the central axis of the chamber, in communication with the ozone generator and having ozone entry ports in communication with the chamber. When the ozone delivery system comprises a tube, the apparatus may also comprise a rotating system in communication with the tube. The tube may further comprise wings extending from the external surface of the tube in an angled direction towards the top of the chamber.

Finally, the apparatus of the invention may comprise one or more treatment chambers; each chamber having an ozone delivery system in communication with the ozone generator.

BRIEF DESCRIPTION OF THE DRAWINGS

So that the features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
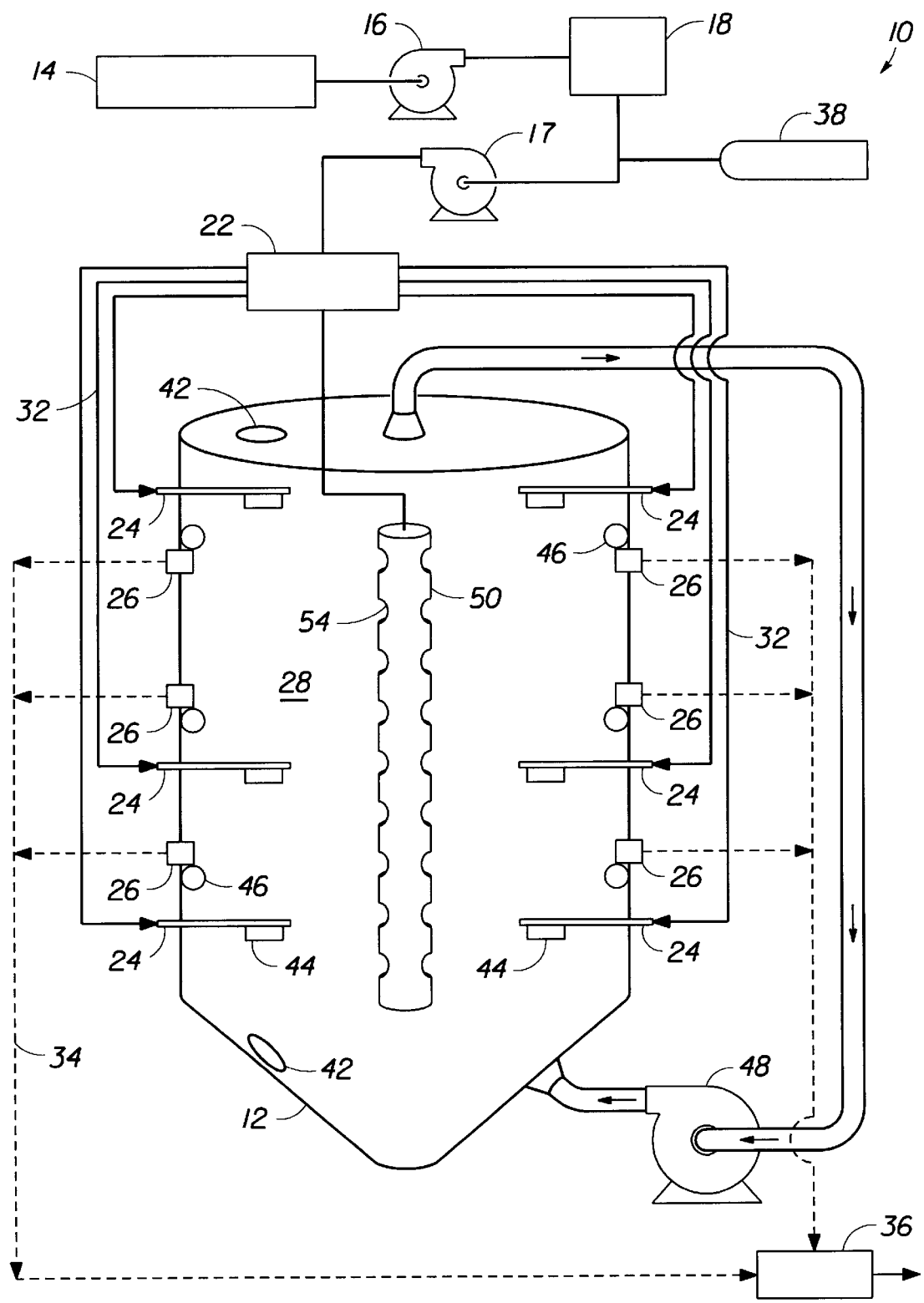
FIG. 1 is a schematic diagram of an ozone delivery and treatment system of the present invention.

The present invention provides a system for the decontamination of agricultural product by use of ozone in the scavenging of microorganisms infecting the product and/or the oxidation of toxins present in the product. The ozone is preferably generated on site and upon demand, thus eliminating ozone waste associated with long periods of ozone storage. The systems provide more efficiency, safety, and environmental friendliness in the use of ozone for product decontamination by optimizing the delivery of ozone to the contaminated product, monitoring the pressure in the treatment systems, monitoring the heat generated during the treatment of contaminated product with ozone, and controlling ozone release into the atmosphere.

While the detailed description of the invention may focus on the ozone treatment of agricultural product contaminated with mycotoxins, and particularly aflatoxins, the ozone treatment provided by the invention is likewise effective in chemically inactivating a variety of toxins and scavenging a variety of microorganisms that may infect the agricultural product. Examples of toxins that may be effectively eliminated by the methods of the invention comprise but are not limited to aflatoxins, fumonisin $B_1$, ergot, zearalenone, cyclopiazonic acid, patulin, tricothecenes, ochratoxin A, and secalonic acid D. Thus, all ozone treatments of agricultural products using the methods and apparatus of the invention are encompassed by the invention and are considered within the scope of the present specification.

The invention provides an ozone containing gas for the treatment of agricultural products, such as whole grains, seeds, nuts, spices, fruits, and grasses. The ozone provided by the invention may be generated on-site by a device based on currently available technologies or their equivalents. The techniques and devices of the invention may be adaptable for use with any advanced ozone generating system. On a commercial basis, ozone is currently produced by the silent electric discharge process, otherwise known as corona discharge, wherein air or oxygen is passed through an intense, high frequency alternating current electric field. The corona discharge process forms ozone through the following reaction:

$$^3/_2O_2 \Rightarrow O_3 \Delta H^\circ_{298} = 34.1 \text{ kcal}$$

Yields in an air fed corona discharge process are generally in the vicinity of 2 wt % ozone, i.e., the exit gas may be about 2% $O_3$ by weight. If the corona is provided with pure oxygen, the yield in ozone may jump to 6 wt %. Such $O_3$ concentrations, while quite poor in an absolute sense, are still sufficiently high to furnish usable quantities of $O_3$ for the indicated commercial purposes. Another disadvantage of the corona process is the production of harmful $NO_x$ otherwise known as nitrogen oxides. Other than the aforementioned electric discharge process, there is no other commercially exploited process for producing large quantities of $O_3$.

However, $O_3$ may also be produced through an electrolytic process by impressing an electric current (normally D.C.) across electrodes immersed in an electrolyte, i.e., electrically conducting fluid or solid polymer electrolyte. The electrolyte includes water, which, in the process dissociates into its respective elemental species, $O_2$ and $H_2$. Under the proper conditions, the oxygen is also evolved as the $O_3$ species. The evolution of $O_3$ may be represented as:

$$3H_2O \Rightarrow O_3 + 3H_2 \Delta H^\circ_{298} = 207.5 \text{ kcal}$$

It will be noted that the $\Delta H^\circ$ in the electrolytic process is many times greater than that for the electric discharge process. Thus, the electrolytic process appears to be at about a six-fold disadvantage. Other methods and techniques for on-site production of ozone are described in U.S. Pat. No. 5,460,705, incorporated herein by reference in its entirety.

The invention also provides means of delivering ozone gas or an ozone containing gas under controlled humidity, flow rate and ozone concentration to a contaminated product, or product to be preserved. The ozone containing gas may be produced with humidity as part of the production process, or the ozone may be humidified before delivery to a treatment chamber. The treatment chamber may the same or a different vessel as that used for long term storage of the product to be treated or preserved. Contaminated product may then be contacted with the ozone containing gas.

Ozone delivery may be controlled by placing one or several temperature probes at various locations within the treatment chamber. When a certain temperature is reached, a temperature probe may send a signal to shut off the delivery of ozone containing gas to the treatment chamber or a region within the treatment chamber.

Further, the invention provides for better control of localized overheating through even distribution of the ozone gas throughout the treatment chamber. The invention encompasses several techniques to evenly distribute the ozone, including (1) special ozone contactors to supply the ozone to the contaminated product; or (2) a fan placed in the treatment chamber to create a pressure gradient and distribute ozone or ozone containing gas throughout the treatment chamber. Even distribution of the ozone bearing gas may also be achieved by placing multiple gas entry and exit ports at various locations on and within the storage unit, thus establishing different gas flow paths. The invention provides for ozone release control by placing ozone detectors at strategic positions around the treatment chamber. In order to closely monitor ozone delivery and release, ozone detectors may be placed within the treatment chamber, at gas entry and/or exit ports.

The invention allows for safer ozone treatment by providing one or more ozone destruction units that may be placed in the treatment chamber at one or more gas exit ports. Ozone destruction units may destroy any ozone that is being evacuated to the atmosphere. The invention also provides pressure sensors that may be placed within the treatment chamber to prevent pressure build-up by controlling the supply of ozone to the treatment chamber, thus reducing the risk of damage to the treated product and/or the treatment equipment.

The invention also provides for control of the degree to which contaminated product is treated so that over-treatment may be avoided. For example, over-treating the material may be avoided by analyzing samples extracted from the treatment chamber at regular intervals. One method provided by the invention for safe sampling comprises pumping air into the treatment chamber and forcing ozone through the exit ports where it is destroyed by the ozone destruction units. Ozone detectors may then signal the point at which the ozone has been destroyed, allowing for safe removal of samples that may be analyzed.

One aspect of the invention provides an apparatus for decontaminating products contaminated with mycotoxins or preventing mycotoxin contamination of products stored for long periods of time under conditions that would otherwise promote contamination. The apparatus may comprise a treatment chamber, preferably made of or having a coating of ozone resistant material, in which the product may be loaded by conventional methods such as the use of an auger or a conveyor. The treatment/storage chamber allows the product to surround an ozone delivery system comprised of one or more ozone resistant hollow tubes, allowing distribution of the ozone containing gas throughout the matrix of product being formed. The hollow tubes may comprise perforations along their length for ozone supply to the matrix. The tubes may be placed in a variety of positions and locations within the treatment chamber, preferably in a vertical position down the center of the treatment chamber which may be of any shape.

The ozone gas may be supplied by an on-site ozone generator, such as a corona discharge in treatments requiring only low concentrations of ozone or an electrochemical ozone generator in treatments requiring high concentrations and/or pressurized ozone gas. Prior to use in the treatment chamber, the ozone containing gas may be passed through a humidifier where it may take up moisture. Moisture content of the ozone gas used for treating mycotoxins may range from 0% to 100%, depending on the type of treatment. In treatments for aflatoxin decontamination it has been found that ozone with a humidity content in excess of 80% is generally effective and could produce complete decontamination. Once humidified, if at all, the ozone containing gas is then passed into the distribution system where it may be distributed to different locations in the product matrix and displace the air that normally resides in the interstitial space within the matrix formed by the product.

In order to prevent over-pressurizing the treatment/storage chamber with ozone, one aspect of the invention provides gas vents placed on the side of the chamber and opened either periodically or when pressure sensors positioned inside the chamber indicate a pressure inside the chamber that is higher than a given value. When the pressure sensors detect a high pressure inside the chamber, it is preferred to stop the supply of ozone to the treatment chamber.

Another aspect of the invention provides control of the exothermic reaction between ozone and the stored product to prevent overheating. Because ozone may react as soon as it contacts the product, hot spots may be created within the matrix, particularly at ozone delivery ports. To prevent excess heating, one or more temperature sensors may be positioned within the treatment chamber. When the temperature reaches a given setpoint, the supply of ozone may be stopped, and/or ozone may be dispersed through the matrix by creating in the chamber, for a determined period of time, a succession of positive and negative pressures. The intermittence of negative and positive pressure within the chamber may not only disperse the ozone but also help regulate the temperature. The temperature sensors may be positioned at various locations within the treatment system, but are preferably positioned near the ozone entry ports in the ozone delivery system.

Yet another aspect of the invention provides ozone sensors positioned at strategic positions both inside and outside the storage/treatment chamber. Ozone sensors positioned inside the chamber may indicate the concentration of ozone in any particular location in the chamber. Positioning ozone sensors at the exit ports where the gas may be evacuated from the chamber allows for detecting ozone leakage out of the chamber. When ozone leakage is detected, the chamber may be sealed, and the ozone supply may be suspended until the leakage is controlled.

A further aspect of the invention provides pressure sensors positioned at various locations within the ozone treatment system. When the pressure inside the chamber reaches a certain level, the pressure sensors may cause the gas vents in the treatment chamber to open.

The treatment system may also comprise ozone destruction units, preferably positioned at the exit ports of each vent or at the end of a manifold coupled to the exit ports. When the exit vents are opened, it is preferred that the ozone gas passes through ozone destruction units placed down stream of the vents so that the ozone is destroyed before it is released into the atmosphere. Ozone destruction units provided by the invention preferably decompose any ozone passing through them to molecular oxygen. A particular ozone destruction unit may be activated when the ozone vent or vents connected to it are opened, thus preventing uncontrolled release of ozone gas into the atmosphere.

During the treatment process, it may be desirable to remove samples of the treated products to assess the progress of the decontamination. The invention provides sampling devices that may be incorporated into the treatment system. The sampling capabilities provided by the invention allow safe withdrawal of one or several samples from different depths within the chamber so that representative samples may be analyzed.

The invention provides an apparatus comprising a manifold for ozone delivery to a matrix of contaminated product or product to be preserved. The manifold may be connected to a treatment/storage chamber through a multiplicity of entry ports. Preferably, each entry port may be controllably closed or opened as needed to supply ozone or ozone containing gas to particular locations within the treatment chamber. The treatment chamber may also comprise a plurality of ozone exit ports. Each exit port may be placed in a location that would allow the evacuation of ozone gas that enters the chamber, primarily from a corresponding ozone entry port. The coupling of ozone entry and exit ports may provide better control of ozone flow through any particular portion of the chamber. For example, an ozone entry port and a corresponding exit port may be opened simultaneously so that ozone flow may be directed to a particular portion of the treatment chamber. As the temperature and/or ozone concentration increase within the portion subjected to ozone flow, the ozone entry and exit ports may be closed and a different set of ozone entry and exit ports may be opened to direct the ozone flow to a different portion of the treatment chamber.

The invention also provides for parallel treatment of more than one portion of product in the treatment chamber. It is preferred however that portions of the product being treated at the same time be somewhat separated by one or more portions with entry and exit ports being closed. Isolating the portions being treated may provide better control of the changes in the temperature and ozone concentration.

Coupled ozone entry and exit ports may be distributed throughout the ozone delivery manifold and the treatment chamber so that the total ozone flow within a given treatment run may cover all areas within the treatment chamber. Furthermore, ozone sensors and temperature sensors may be coupled to each set of ozone entry and exit ports. When the temperature indicated by a particular sensor rises above a given value and/or the ozone concentration measured by the corresponding ozone sensor increases above another given value, a signal may be sent, for example to a relay that would close the ozone entry and exit ports associated with the portion of the treatment chamber where overheating and/or ozone overflow may have been detected and open another set of ozone entry and exit ports.

Intermittent supply of ozone to different sections of the treatment chamber may permit continuous use of ozone without turning the entire system off due to overheating or over exposure to ozone in any one or more portions of the treatment chamber. A shut down of the supply of ozone to the entire treatment chamber may be necessary only when ozone and/or temperature sensors indicate high ozone levels and/or high temperatures in all the sections of the treatment chamber.

In one aspect of the invention, contaminated product may be introduced from a hopper into the treatment chamber, such as by a particle conveyor of the auger type, where the product may be exposed to humidified and/or preheated sterilizing gas, such as ozone or ozone containing gas. The treatment chamber may be maintained at a pressure slightly below atmospheric to contain the gas inside the treatment chamber. Internal pressure may be monitored by a pressure sensing device which may send a signal to a valve controller to open a valve to a vacuum when the pressure in the chamber reaches a given value. The vacuum valve opening may permit gas discharge and maintain the chamber under a desired pressure.

Another aspect of the invention provides an apparatus that may operate in a cyclic treatment regime. The regime may comprise a filling phase and a contacting phase. In the filling phase, ozone may be introduced evenly throughout the contaminated product, for example by using multiple gas distribution ports. Monitoring and feedback control mechanisms may be included in the system for better control of the rate of ozone dosing. The conduit connecting the treatment chamber containing the contaminated product to the ozone delivery system may initially be partially open so that the chamber may be provided with ozone.

Ozone and temperature monitoring devices may be used to control the amount and rate of ozone bearing gas being introduced during the filling phase. When ozone content and/or the temperature in the treatment chamber reach a given value, the conduit connecting the treatment chamber to the ozone delivery system may be closed and the chamber sealed until the ozone content and the treatment chamber temperature drop below another given value. Controlling the concentration and/or quantity of the ozone delivered to the chamber may prevent local heating and provide an even distribution of the ozone bearing gas through the treatment chamber. Controlled ozone delivery may be used to build up the ozone concentration in spaces between the materials up to a desired level.

Once the desired ozone concentration is reached, the treatment chamber containing the stored material may be sealed or blocked in, and ozone delivery may be stopped. After the suspension of the ozone supply, contact and reaction between the ozone in the chamber and the contaminated material proceeds until all of the ozone is consumed. The contacting phase is determined by the time necessary for the consumption of all the ozone supplied to the treatment chamber during any filling phase. At the end of a contacting phase, another filling phase may be initiated and the filling-contacting cycle may be repeated as many times as desired until the contaminants in the product drop to an acceptable level, at which time the treated product may be withdrawn and the treatment or storage chamber recharged with another batch of contaminated product.

In yet another aspect of the invention, ozone may be generated on-site and forced, under pressure, into one of several containers where the material to be treated may be held. A controlled valve system, comprising one or more valves, may direct the ozone into one or more containers. When an adequate quantity of ozone has been supplied to, and circulated through the container or containers, the ozone gas flow may be cut off and diverted, using the valve system, to the next container or set of containers. While the second set of containers is being filled, the ozone in the first set of containers may be reacting with the material which may be detoxified. As the second set of containers becomes full or otherwise contains an adequate amount of ozone, the ozone supply to the second set of containers may be stopped, the second set of containers sealed and ozone delivery to the first set of containers resumed and/or ozone delivery to a third set of containers initiated. Intermittent ozone flow in different sets of containers allows efficient use of the ozone, which may be continually generated on-site and delivered to the containers until all of the product in the storage units has been treated.

In a further aspect of the invention, contaminated product, and or product to be preserved from contamination, may be moved around inside the treatment chamber continuously or intermittently during the exposure to ozone. Ozone or an ozone containing gas may be delivered down a channel, of a hollow auger for example, with holes machined on its sides. The channel is preferably placed at the center of the treatment chamber. The ozone may flow through the holes in the channel and into the spaces around the product. Optionally, the auger may be rotated, for example by a motor, preferably a variable speed motor.

Optionally, the ozone delivery system may comprise wings placed along the side of the auger, preferably adjacent to each hole, allowing for even better distribution of the ozone through the matrix by lifting the product upwards through the storage treatment chamber as the auger is rotated. When the temperature and/or pressure inside the treatment chamber reach a given value, a signal may be sent to cut off the supply of gas to the chamber. The ozone concentration within the chamber may be controlled and adequate ozone concentration inside the treatment chamber may be maintained by either resuming the supply of ozone when low ozone concentrations are detected, or stopping ozone delivery and forcing the ozone through exit ports, preferably through ozone destruction units placed down stream of the ozone exit ports, when high ozone concentrations are detected.

In another aspect of the invention, a gas circulation system, such as a circulating loop placed around the storage/treatment unit, may be added to the treatment system. The ozone may first be directed from one or more of the ozone exit ports into the circulation system, and then directed into the treatment chamber unit.

FIG. 1 is a schematic diagram of an ozone delivery and treatment system 10 of the present invention. The treatment system 10 may be useful in decontaminating all types of agricultural products, and the system is particularly useful in decontaminating agricultural or particulate food products, such as whole grain, seeds, fruits, grasses, and nuts contaminated with mycotoxins. The system is also useful in preventing contamination during the storage of these products. The system 10 comprises a chamber 12 suitable for treating and optionally storing agricultural products. The chamber may be made of any rigid material capable of supporting the weight of the product, although an ozone resistant material or material having an ozone resistant coating is preferred so that the system may be operated for long periods of time. It is also preferable that the chamber be suitable for filling with agricultural products such as whole grain, seeds, fruits, grasses, and nuts by conventional methods such as an auger, a conveyor, pneumatic flow, etc. The treatment system 10 comprises an ozone generating unit 14 optionally connected to a humidifier 18 for optionally humidifying the ozone before it is supplied to the treatment chamber. The ozone generating unit and the humidifier are provided in fluid communication by a conduit. A pump 16 is optionally placed between the humidifier and the ozone distribution system 22 which delivers the ozone to the treatment chamber at various gas entry ports 24. In accordance with one aspect of the invention, each entry port 24 is matched with a corresponding ozone exit port 26 to provide enhanced control of the flow of ozone in selected locations of the product matrix 28 within the chamber 12. While any number of entry and exit ports may be utilized, an exemplary ozone distribution system 22 comprises six ports of ozone delivery to the treatment chamber. All entry ports are also coupled to an inlet manifold 32 which is supplied with ozone that is pumped through the humidifier by the pump 17. All ozone exit ports 26 are coupled to or in communication with an outlet manifold 34 which is in turn in communication with an ozone destruction unit 36 in which any remaining ozone is destroyed so that no ozone is released into the atmosphere.

The treatment system optionally further comprises a gas source 38 for mixing with ozone before delivery to the treatment chamber. The gas source 38 allows independent control of the pressure or ozone concentration inside the treatment chamber without changing the flow rate or quantity of ozone supplied to the product matrix. The gas source 38 is preferably a nonreactive gas, such as an inert gas, but may comprise other treatment gases.

The pressure inside the chamber is preferably detected and monitored by positioning pressure sensors 42 at various locations inside the chamber. The temperature is preferably detected and monitored by a set of thermocouples 44 distributed throughout the chamber 12, most preferably adjacent the ozone entry ports 24, so that local overheating may be detected as early as possible. The ozone concentration in the chamber 12 is preferably detected and monitored by a plurality of ozone sensors 46 positioned at various locations within the chamber 12, most preferably adjacent the ozone exit ports 26. The ozone sensors allow early detection of ozone flow in the relevant region or zone of the chamber. For example, ozone flow in overexposed sections of the matrix may be stopped by closing the ozone entry and exit ports that supply ozone flow to the sections where over-exposure to ozone has been detected.

Finally, the treatment system 10 may optionally further comprise a gas circulation system 48 that is operated to provide a gas flow through the product matrix when needed. The gas circulating system 48 may be operated to redistribute ozone inside the treatment chamber or to evacuate remaining ozone when the treatment is completed or suspended.

Figure 2:
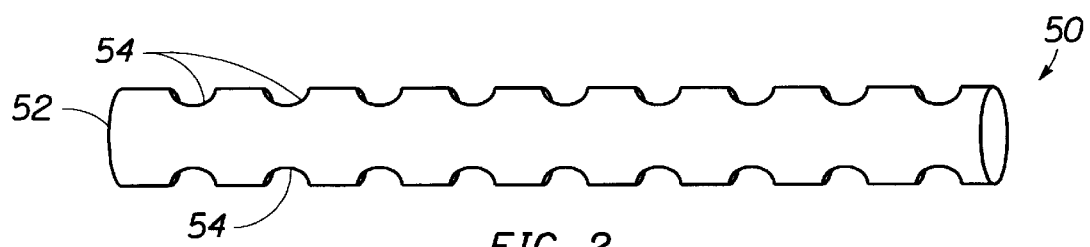
FIG. 2 is a schematic diagram of an ozone delivery system that can be used in conjunction with the ozone treatment system of FIG. 1.

FIG. 2 is a schematic diagram of an ozone delivery system 50 that can be used in conjunction with the ozone treatment system of FIG. 1. The ozone distribution system 22 may be optionally replaced by or used in conjunction with the alternative ozone delivery system 50. The ozone delivery system 50 comprises an ozone resistant hollow tube 52 with holes 54 perforated along at least a portion of its length. The ozone delivery system 50 may be placed down the center of the chamber 12 and extend a major portion of the distance from the top of the chamber to the bottom of the chamber. Ozone may be supplied through the holes 54 to various sections within the treatment chamber. The ozone delivery system 50 may be used in replacement of or in conjunction with the ozone distribution system 22. When the ozone delivery system 50 is used in conjunction with the ozone distribution system 22, ozone may be supplied from the ozone generator unit 14 or humidifier 18 to the treatment chamber through both the inlet manifold 32 and the hollow tube 52. The ozone delivery system 50 is optionally coupled to an agricultural product loading system (not shown.) The agricultural product may be loaded into the chamber 12 a conventional agricultural apparatus, such as an auger, a conveyor, a conveyer belt, a bucket, etc. In this configuration, the product may be loaded through port (not shown) located at or near the top of the chamber 12. A sensor (not shown) allows monitoring and control of the filling of the chamber 12 with the product. Strategically positioning the loading system (not shown) at the top of the treatment chamber allows the agricultural product to surround the ozone delivery system 50 as it is loaded, forming the matrix 28 around the ozone delivery system 50.

Figure 3:
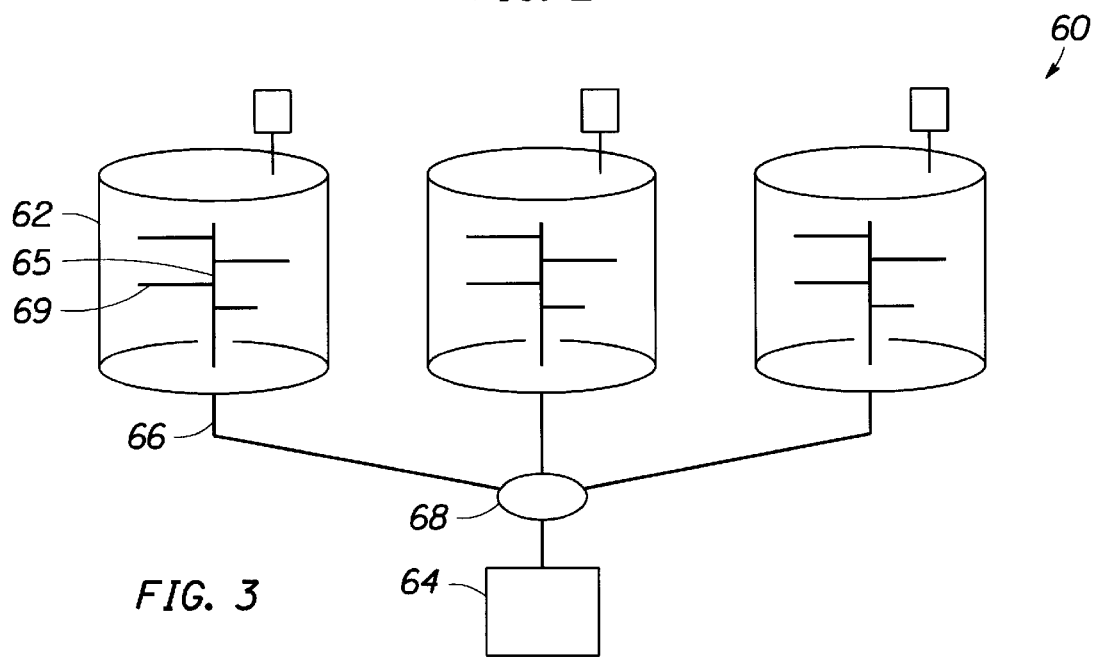
FIG. 3 is a schematic diagram of a multiple-chamber ozone treatment system of the invention.

FIG. 3 is a schematic diagram of a multiple-chamber ozone treatment system 60 of the present invention. The multiple-chamber system 60 comprises a plurality of chambers 62 communicating with at least one common ozone source 64. Each chamber 62 is in communication with the ozone source 64 through a dedicated conduit 66 and an ozone delivery system comprising a hollow tube 65 extending along the center of the chamber and branches 69 perpendicularly extending from and in communication with the hollow tube 65. Ozone flow into the conduits 66 and the hollow tube 65 is optionally controlled by a valve system 68 which allows for selective supply of ozone to one or more of the chambers 62 at any given time. The multi-chamber treatment system 60 allows more efficient use of the ozone because the ozone may be selectively supplied to one or more chambers allowing continuous use of the generated ozone even when ozone supply to one or more chambers is suspended. The system 60 is also more efficient because it allows the use of smaller ozone generating systems in the treatment of large quantities of contaminated product. Furthermore, the system 60 allows one or more chambers to be filled with ozone while the ozone in one or more other chambers is contacting the product.

Figure 4:
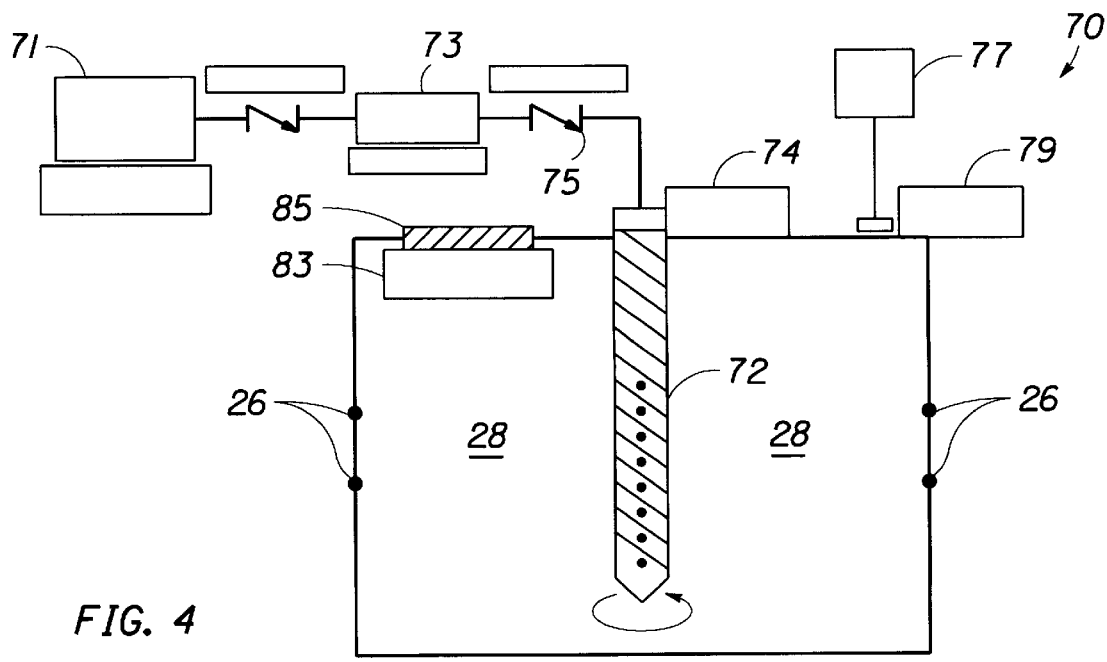
FIG. 4 is a schematic diagram of an ozone treatment system with a rotating ozone delivery mechanism.

FIG. 4 is a schematic diagram of an ozone treatment system 70 with a rotating ozone delivery mechanism 72 similar to the ozone delivery system 50 of FIG. 2. The system 70 also comprises an ozone generator 71 in communication with the ozone delivery mechanism 72. A humidifier 73 and one or more pumps 75 may optionally be positioned in the passage communicating the ozone generator 71 with the ozone delivery mechanism 72. The system 70 also comprises an ozone monitor 77, an ozone destruction unit 79, a pressure sensor 83, and a temperature sensor 85. A motor 74 is coupled to the ozone delivery system 50 in order to periodically or continuously rotate the delivery mechanism 72 to allow for better distribution and circulation of the ozone throughout the product matrix 28 by delivering the ozone in different directions in the product matrix 28 as the ozone delivery system is rotated. The motor may be operated at various speeds and the direction of rotation may be reversed as desired.

Figure 5:
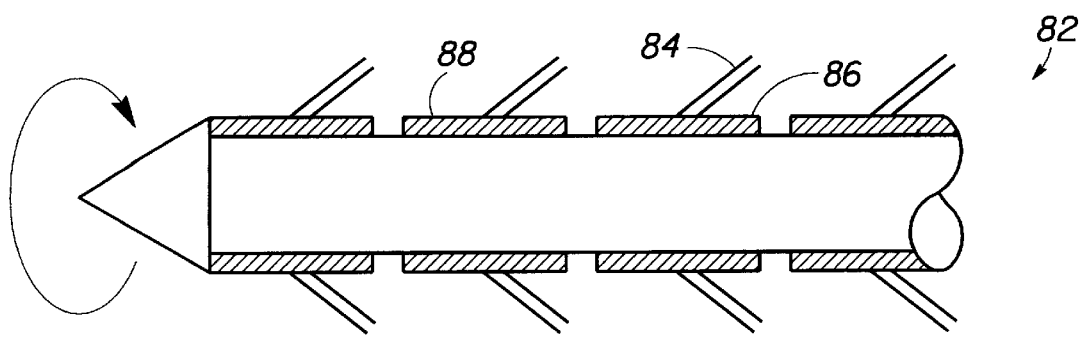
FIG. 5 is a schematic diagram of an ozone delivery system with a rotating mechanism and a set wings.

FIG. 5 is a schematic diagram of an ozone delivery system 82 with a rotating mechanism and a set of wings. The ozone delivery system 82 is similar to the ozone delivery system 72 of FIG. 4 with the addition of wings 84 encircling the tube 88 adjacent or between the holes 86. The wings 84 are extended in an angled direction from the tube 88 and face upwards towards the top of the chamber 12 to lift the product upwards through the chamber as the ozone delivery system 82 is rotated. The lifting of the product in the immediate vicinity of the ozone delivery system allows better mixing of the product matrix by continuously replacing the product immediately exposed to the ozone, resulting in a more uniform treatment of the contaminated product. Optionally, the mixing of the product may be improved by using wings with an wavy shape allowing even easier lifting of the product.

Figure 6:
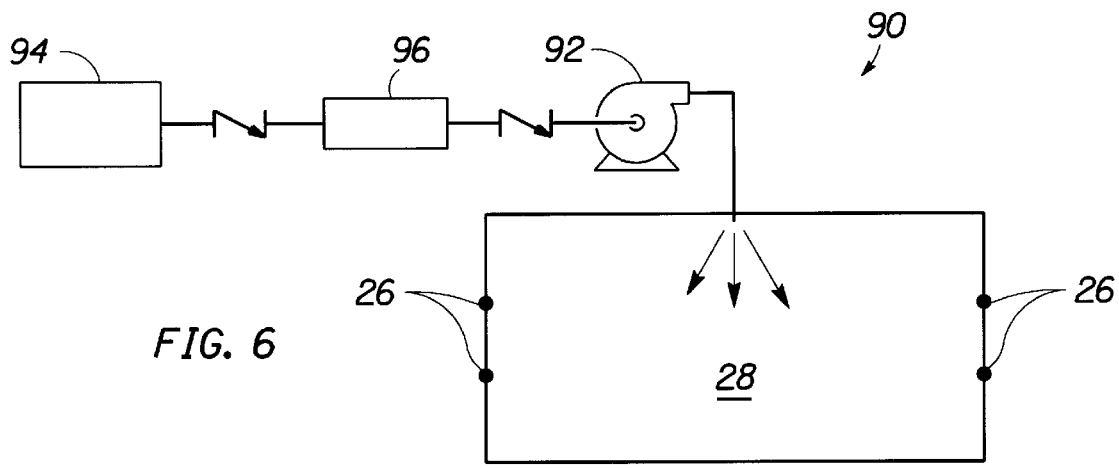
FIG. 6 is a schematic diagram of an ozone treatment system with a blower.

FIG. 6 is a schematic diagram of an ozone treatment system 90 similar to the ozone treatment system 10 of FIG. 1 with the ozone delivery system 22 replaced with an ozone blower 92. The ozone blower 92 provides an alternate mechanism for delivering the ozone uniformly to the product matrix 28. The ozone blower 92 is in communication with the ozone source 94. A humidifier 96 may optionally be positioned in the passage between the ozone source 94 and the ozone blower 92. The ozone blower 92 may be used separately or in conjunction with the air blower 48 of FIG. 1. The ozone blower 92 may optionally be substituted with or coupled to a gas compressor. Also, the ozone delivery mechanisms 22, 50 and 92 may be used separately or together within one single treatment system such as the system 10 depicted in FIG. 1.

The following examples show the function of the present invention and some of its preferred embodiments.

EXAMPLE 1

This example illustrates the treatment of mycotoxin contaminated corn with a continual flow of ozone.

The data presented in Table 1 illustrate the efficacy of the invention in detoxifying mycotoxin contaminated whole corn. One (1) kg of aflatoxin contaminated whole kernel yellow corn was placed in a treatment chamber. Ozone gas was generated electrochemically to obtain a gas stream with an ozone concentration of about 10 wt % in oxygen. The ozone was humidified by mixing with water by passing the gas through a column of water to obtain a gas stream with over 80% humidity. A series of ozone resistant tubes connected the ozone generator to the treatment chamber, and a series of valves in the tubes were used to control the flow of ozone into the chamber. A pressure sensor was disposed in the chamber in order to open an outlet valve when pressure build-up within the treatment chamber was detected. The outlet connected to an ozone monitor to detect ozone gas exiting the treatment chamber. The electrochemical generation of ozone allowed the supply of an ozone stream capable of penetrating the product matrix and overcoming any resistance that may be exerted by gases already present in the chamber. Temperature probes were also placed inside the treatment chamber to monitor temperature changes. Ozone was passed through the chamber for 96 continuous hours. Samples were removed for analysis at different times during the treatment. The decrease in the aflatoxin contamination as a function of the amount of ozone provided to the contaminated product is reported in Table 1.

Figure 7:
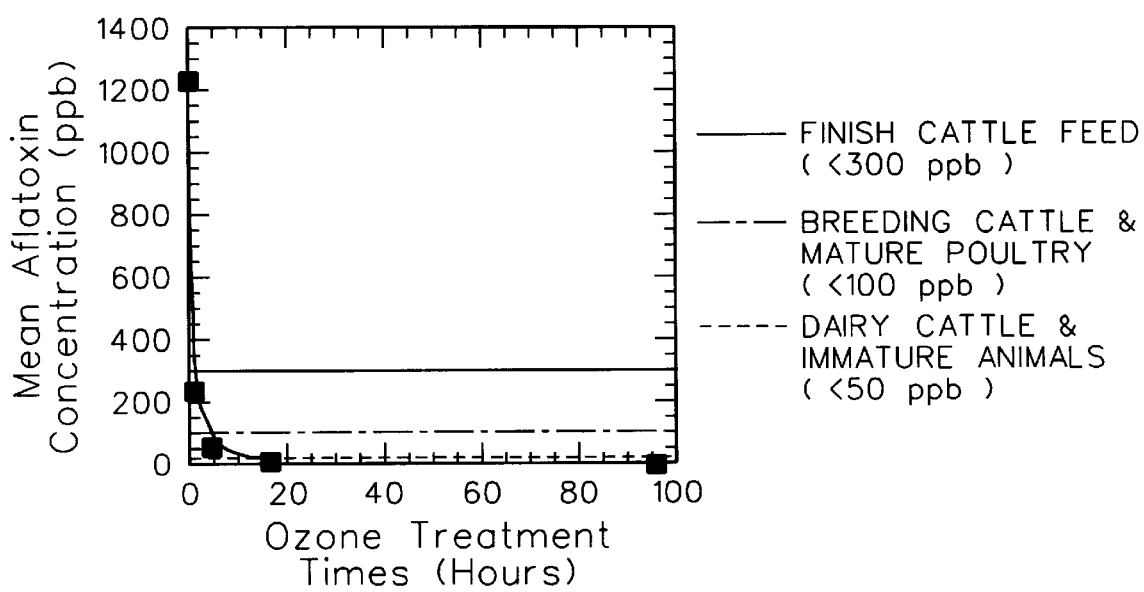
FIG. 7 is a graph illustrating the decrease in aflatoxin concentration in 1 Kg of contaminated corn as a function of exposure time to a continuous stream of ozone gas.

FIG. 7 is a graph illustrating the decrease in aflatoxin concentration in one (1) kg of contaminated corn as a function of exposure time to a continuous stream of ozone gas. The graph shows that after 1 hour of treatment, the corn was decontaminated to the point where it could constitute acceptable feed to finishing cattle. Further treatment, up to 4 hours, reduced the aflatoxin contaminant to a level where it could be safely fed to breeding cattle and mature poultry. As shown in the graph, treatment for only 16 hours drastically decreased the concentration of aflatoxins yielding decontaminated corn that could be safely fed to dairy cattle without the risk of contaminating the milk. However, exposure to ozone for more than 16 hours was necessary for the reduction of aflatoxins in the corn to levels undetectable by HPLC.

This example presents the data obtained in a second continuous ozone flow experiment. The experimental set-up used in this example was identical to the one operated in Example 1, except that the treatment chamber was pressurized to 20 psi. A backpressure valve was positioned in the chamber near the exit port. A positive pressure build up inside the chamber is created and sustained by the supply of the ozone through the self compressing electrolysis process. The data reported in Table 2 illustrate the decrease in aflatoxin concentration as a function of the time of exposure to ozone and the amount of ozone used. The data show that the decrease in mycotoxin concentration as function of the duration of the exposure to ozone, generally followed the same profile indicated by the results obtained in Example 1.

TABLE 1

Data obtained from an experiment where ozone gas (178 mg/min.) was passed through 1 kg of aflatoxin contaminated corn in a continual flow ozonation treatment.

|  | Aflatoxin Concentration | Ozone Dose (grams) |
|---|---|---|
| 0 hour mean | 1220.2 ppb | 0 |
| 1 Hour | 228.0 ppb |  |
|  | 242.0 ppb | 10.68 |
| Mean | 235.0 ppb |  |
| 4 Hours | 59.8 ppb |  |
|  | 64.2 ppb | 42.72 |
| Mean | 62.00 ppb |  |
| 16 Hours | 13.8 ppb |  |
|  | 10.8 ppb | 170.88 |
| Mean | 12.30 ppb |  |
| 96 Hours | 0.0 ppb |  |
|  | 0.0 ppb | 1025.28 |
| Mean | 0.00 ppb |  |

TABLE 2

Data obtained from an experiment where ozone gas (178 mg/min.) was passed through 1 kg of aflatoxin contaminated corn in a continual flow ozonation treatment and a pressure of 20 psi.

|  | Aflatoxin Concentration | Ozone Dose (grams) |
|---|---|---|
| 0 hour mean | 1220.2 ppb | 0 |
| 1 Hour | 289.2 ppb |  |
|  | 295.6 ppb | 10.68 |
| Mean | 292.4 ppb |  |
| 4 Hours | 328.7 ppb |  |
|  | 104.6 ppb | 42.72 |
| Mean | 216.65 ppb |  |
| 16 Hours | 82.2 ppb |  |
|  | 95.0 ppb | 170.88 |

TABLE 2-continued

Data obtained from an experiment where ozone gas (178 mg/min.) was passed through 1 kg of aflatoxin contaminated corn in a continual flow ozonation treatment and a pressure of 20 psi.

|  | Aflatoxin Concentration | Ozone Dose (grams) |
| --- | --- | --- |
| Mean | 88.6 ppb |  |
| 96 Hours | 0.0 ppb |  |
|  | 0.0 ppb | 1025.28 |
| Mean | 0.00 ppb |  |

EXAMPLE 3

This example illustrates intermittent ozone flow treatment using the cyclic treatment capabilities of the two phase system of the invention. Unlike Examples 1 and 2 where the ozone gas was continuously passed through the treatment chamber, the experiments reported in this example used a treatment cycle comprising a succession of "filling" and "contacting" phases. A set of electronic timers were used to switch between the phases.

The first step was determining the initial amount of ozone needed to treat the contaminated corn disposed in the treatment chamber. The ozone/oxygen gas was generated by an electrochemical cell and humidified by adding water by passing the gas through a water column. A valve linking the ozone generator to the treatment chamber was opened and ozone gas flowed into the chamber through a vertical, centrally disposed, hollow tube with a plurality of holes in the side. An ozone monitors was placed at exit ports within the treatment chamber to detect ozone exiting the treatment chamber. When the concentration of ozone gas exiting the chamber reached the concentration in the gas entering the chamber, valves connected to the entry and exit ports were closed, sealing the treatment chamber, and signaling the completion of the filling phase of the treatment cycle. The temperature was continuously monitored through thermal probes and ambient pressure was maintained inside the chamber. The design used in this example included a mechanism for pumping an inert gas through the system to displace the ozone. During the second phase of the treatment, the ozone was allowed to contact and react with the corn without providing any additional ozone gas to the chamber until the ozone concentration dropped to zero, at which point a sample of the corn was analyzed and another cycle of filling and contacting was initiated if needed. Analysis of the data revealed that one (1) hour was a sufficient period of time for all the ozone in the chamber to react with the mycotoxins or otherwise degrade. Thus the contacting phase was allowed to proceed for 1 hour in each cycle. At the end of each contacting phase, a sample of the corn was removed and analyzed for determining mycotoxin concentration.

Figure 8A:
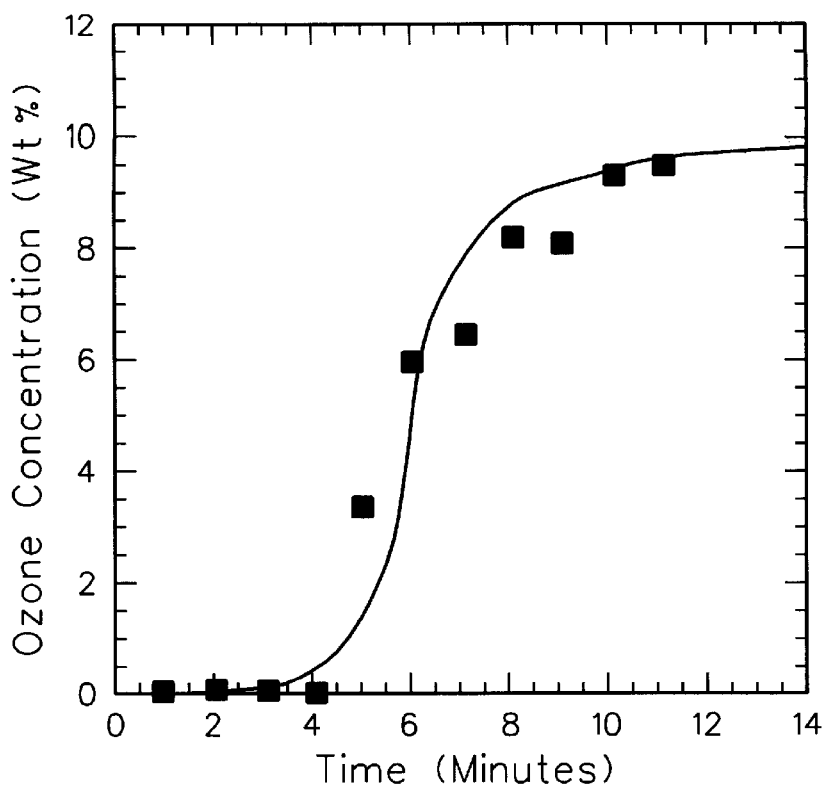
FIGS. 8(*a–b*) are graphs illustrating the amount of ozone supplied to the treatment chamber during the first and fourth filling phases, respectively, in a series of successive treatment cycles.
Figure 8B:
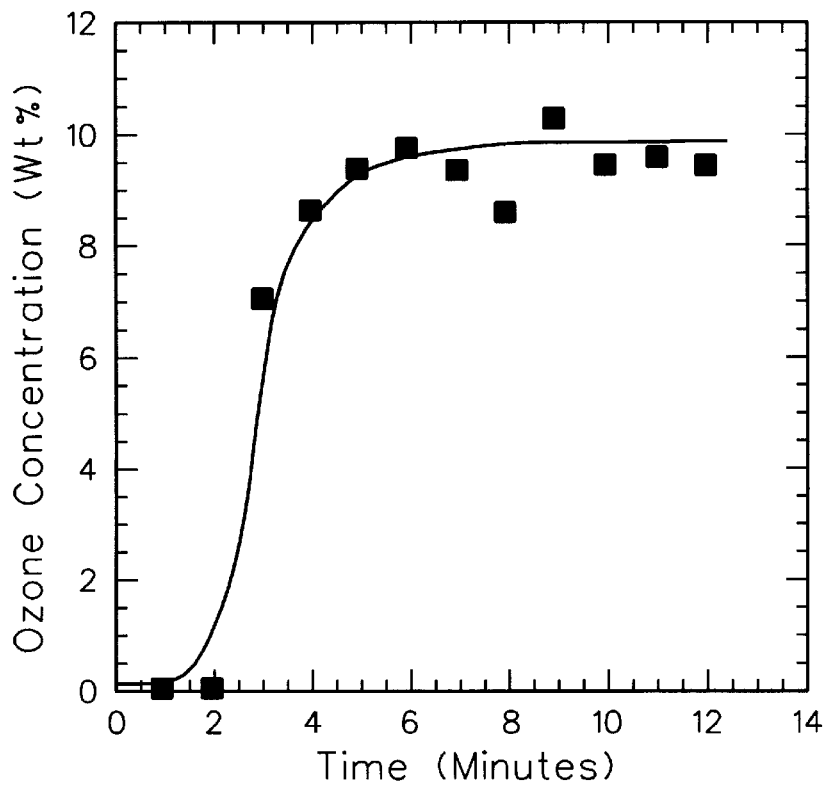

FIGS. 8(a–b) are graphs illustrating the amount of ozone supplied to the treatment chamber during the first and fourth filling phases, respectively, in a series of successive treatment cycles. The graphs show the variation in the UV absorbance at 255.3 nm as a function of ozone filling time in minutes. Ozone was supplied to the chamber until the absorbance of the exiting gas reached a maximum. FIG. 8(a) shows that for the first cycle, the chamber was supplied with ozone gas for 10 minutes before the concentration of the exiting ozone reached a plateau signaling the end of the filling phase. At the end of the filling phase, the chamber was sealed and the ozone already in the chamber was allowed to contact the product without additional supply of ozone. FIG. 8(b) shows the ozone filling profile of the filling phase in a fourth cycle initiated after the ozone supplied to the chamber during a third cycle was totally consumed. The graph shows that the time required to fill up the chamber with ozone to a point where the concentration of exiting ozone reaches a plateau in the fourth cycle was much shorter than the time required in the first cycle, in the fourth cycle, three (3) minutes of ozone supply were sufficient for the concentration of exiting ozone to reach a plateau while 10 minutes were necessary to fill up the chamber with ozone during the first cycle.

Table 3 shows how the aflatoxin concentration dropped as the number of treatment cycles increased. The data show that the "two phase" treatment cycle was effective in removing the aflatoxin present on the corn.

TABLE 3

Data obtained from an experiment where ozone gas (178 mg/min.) was passed through 1 kg of aflatoxin contaminated corn in an intermittent flow ozonation treatment with the reactor being filled with ozone for 10 min every hour.

|  | Aflatoxin Concentration | Ozone Dose (grams) |
| --- | --- | --- |
| 0 Treatment Cycles | 1220.2 ppb | 0 |
| Standard Deviation | 146.6 ppb |  |
| 4 Treatment Cycles | 274.8 ppb |  |
|  | 256.4 ppb |  |
| Mean | 265.6 ppb | 7.12 |
| Standard Deviation | 13.01 ppb |  |
| 16 Treatment Cycles | 170 ppb |  |
|  | 130 ppb |  |
| Mean | 150 ppb | 14.24 |
| Standard Deviation | 20 ppb |  |
| 24 Treatment Cycles | 57.0 ppb |  |
|  | 59.0 ppb |  |
| Mean | 58.0 ppb | 28.48 |
| Standard Deviation | 1.41 ppb |  |
| 32 Treatment Cycles | 35.0 ppb |  |
|  | 42. ppb |  |
| Mean | 38.5 ppb | 42.72 |
|  | 4.95 ppb |  |
| 48 Treatment Cycles | 8.2 ppb |  |
|  | 7.8 ppb |  |
| Mean | 8.00 ppb | 57.0 |

EXAMPLE 4

This example discusses the results of a turkey feeding study in which one day-old female turkey poults were exposed to aflatoxin contaminated, ozonated and control corn diets. A toxicological feeding study using animals that are sensitive to the toxicity of aflatoxins was conducted in order to demonstrate actual detoxification of aflatoxins using ozone. One objective of this animal study was to evaluate the capability of electrochemically-produced ozone gas to degrade $AfB_1$ in naturally-contaminated whole kernel corn and confirm detoxification in turkey poults.

Corn was procured from the southern coastal area of Texas and analysis by high performance liquid chromatography (HPLC) revealed 1,220±73.3 parts per billion $AfB_1$. The corn was treated in a reactor with a 35 kg capacity for whole kernel corn. The reactor was set up according to the design described in FIG. 3. The ozone generator was connected to the treatment chamber with a series of valves and ozone resistant tubing. Ozone gas was evenly distributed throughout the system using a number of hollow tubes with holes drilled along the length of the tubes. The structure was branched to provide the best ozone distribution through the corn. Control and contaminated corn were treated for 92 h with $O_3$ at 200 mg/min in 30 kg batches; decontamination of the corn by reduction of more than 95% of $AfB_1$ in the contaminated corn was achieved.

The ground corn was mixed with a commercial soybean meal (SBM) based concentrate (46:54 by weight, respectively) that contained or exceeded levels of nutrients recommended by the National Research Council (1994). By blending the corn with SBM, the concentration of $AfB_1$ was effectively reduced by 54%. The SBM ration was free of any detectable mycotoxins and contained no antibiotics, coccidiostats or growth promoters. A diet containing corn that had no detectable aflatoxin was formulated in a similar fashion.

Day-old female British UTA turkey poults were individually weighed, wing-banded and randomly distributed into four equal sets. Six replicate of five poults per pen (n=30 per treatment) were grouped based on the following dietary treatments: 1) control feed containing uncontaminated corn, 2) control feed containing uncontaminated corn treated with 10 wt % $O_3$ at 200 mg/min for 92 h, 3) feed containing corn contaminated with $AfB_1$ and 4) feed containing corn contaminated with $AfB_1$ treated with 10 wt % $O_3$ at 200 mg/min for 92 h. Turkeys were housed in electrically heated batteries under continuous fluorescent illumination with forced ventilation and provided feed and water ad libitum.

Poults were individually weighed and feed consumption for each replicate was recorded weekly. At 3 weeks of age, 18 poults (6 replicates of 3 poults each) from each treatment group were bled by cardiac puncture for serum biochemical analyses and 12 samples from the same poults (6 replicates of 2 poults each) from each group were used for hematological determinations. Four groups of 18 poults were killed by cervical dislocation and the liver, kidney, spleen, pancreas, proventriculus, bursa of Fabricius and heart were dissected and weighed.

When compared to controls, relative weights of the kidney, spleen, pancreas, proventriculus and bursa of Fabricius increased in poults fed the aflatoxin corn diet, whereas the mean relative weight of the liver decreased and the liver appeared greatly discolored. There was a total protective effect by treating the aflatoxin corn with ozone for the liver, kidney, spleen, pancreas, and proventriculus and a partial protection for the bursa of Fabricius. The discoloration of the liver due to the contaminated corn was eliminated by $O_3$ treatment. Additionally, relative organ weights and liver color were not affected by treatment of control corn with ozone.

The corn contaminated with aflatoxin caused significant changes in serum enzyme activities and hematological values. Significant increases were recorded for creatinine kinase, aspartate aminotransferase, alanine aminotransferase and lactate dehydrogenase in poults receiving the aflatoxin corn diet. These effects were completely mitigated by treatment of the aflatoxin corn with ozone. Erythrocyte counts, mean corpuscular hemoglobin and mean corpuscular volume were increased in the aflatoxin corn group. However, birds consuming the diet containing the aflatoxin corn treated with ozone did not differ from controls in these hematological parameters. In addition, serum enzyme activities and hematological values for poults fed the ration containing control corn treated with ozone were not different than activities and values for controls. The aflatoxin corn caused a significant decrease in serum concentrations of triglycerides, cholesterol, calcium, total protein and albumin. Ozonation of the aflatoxin corn alleviated these changes; poults on diets containing ozone-treated aflatoxin corn had values that were not different than controls. No poults fed control corn treated with ozone had any serum chemical values different than controls.

These data demonstrate that treatment of contaminated corn with electro-chemically produced $O_3$ provided protection against $AfB_1$ in young turkey poults. It is important to note that treatment of control corn with $O_3$ did not alter the growth performance, organ weights, or blood/serum chemical and biochemical values of the turkey poults.

EXAMPLE 5

A series of laboratory comparisons were made by treating a batch of aflatoxin contaminated yellow dent whole corn and a batch of aflatoxin contaminated ground yellow dent corn under identical conditions. The experimental data is shown in Table 5. The table shows considerable decrease in aflatoxin concentration on the whole grain corn while the ground corn shows very little change in the aflatoxin concentration. The cost of ozone treatment is dependent on the "ozone demand" of the matrix supporting the aflatoxin species. In the case of the whole corn kernels, the ozone demand is low and therefore the amount of ozone wasted in reactions other than the oxidation of aflatoxin (corn carbohydrates, oils, proteins) is minimal. In treating ground corn, the ozone demand was almost 20 times the quantity of ozone required by the treatment of whole corn. Another consequence of the high ozone demand in the treatment of ground corn is a sharp rise in temperature that was observed during the treatment. With low ozone requirements, the treatment of whole corn resulted in only a moderate increase in the temperature, which did not exceed 35° C., while the temperatures exceeded 80° C. during the treatment of ground corn.

TABLE 4

Data obtained from treating whole corn and corn meal.

| Ozone dose g $O_3$/kg corn | Percentage of Aflatoxin removed % whole corn | Percentage of Aflatoxin removed % ground corn |
| --- | --- | --- |
| 0 | 0 | 0 |
| 7.1 | 78.2 | 0 |
| 28.5 | 95.2 | 1.6 |
| 67.6 | 99.3 | 4.1 |

A significant feature of the efficient invention is the use of ozone generated by a new electrochemical processes and apparatus. In this method, ozone is generated electrolytically from water as opposed to the conventional process in which ozone is generated from molecular oxygen by corona discharge. The advantage offered by the electrochemical process is its ability to generate concentrated ozone (up to 20 wt %) compared to only 2 wt % for an air-fed corona unit or 6 wt % for an oxygen-fed corona unit. The high ozone concentrations allow more efficient oxidative degradation of toxins. In addition, for small scale systems, the equipment costs for electrochemical ozonizers are lower than for corona discharge units. It should be noted however, that in some aspects of the invention, using conventional ozonizers may provide efficient treatment systems, and such systems are within the scope of the present invention.

While the foregoing is directed to the preferred embodiment of the present invention, other and further embodiments of the invention may be devised without departing from the basic scope thereof, and the scope thereof is determined by the claims which follow.

What is claimed is:

1. A method for treating an agricultural product with ozone comprising the steps of:
   introducing a stream of humid ozone-containing gas into a chamber containing the agricultural product;
   monitoring the humidity of the ozone-containing gas within at least one portion of the chamber containing the agricultural product; and
   adjusting the humidity of the humid ozone-containing gas stream before the gas stream enters the chamber to maintain the humidity of the ozone-containg gas in the chamber within a desired range.

2. The method of claim 1, wherein the humidity of the ozone-containing gas stream in the chamber is controlled at greater than about 80% humidity.

3. A method for treating an agricultural product with ozone comprising the steps of:
   introducing a humid ozone-containing gas stream into a chamber containing the agricultural product; and
   contacting the agricultural product with the humid ozone-containing gas stream.

4. The method of claim 3, wherein the agricultural product is selected from feeds for livestock and food for human consumption.

5. The method of claim 3, wherein the agricultural product is selected from grains, nuts, fruits, vegetables, alfalfa, clover, sorghum, fescue grass forages, and combinations thereof.

6. The method of claim 3, further comprising the step of maintaining the humidity of the ozone-containing gas within the chamber at greater than about 80% relative humidity.

7. The method of claim 3, further comprising the step of: reacting the ozone with toxins, toxic metabolites, or microorganisms present on the agricultural product.

8. The method of claim 3, further comprising the step of introducing an inert gas into the chamber along with the ozone-containing gas.

9. The method of claim 8, wherein the inert gas is humidified.

10. The method of claim 8, wherein the inert gas is carbon dioxide, nitrogen, argon, or mixtures thereof.

11. The method of claim 8, further comprising the step of reacting the ozone with toxins present in the inert stabilizing gas.

12. The method of claim 3, further comprising providing air into the chamber.

13. The method of claim 3, further comprising the step of scavenging microorganisms in the air.

14. The method of claim 3, further comprising the step of generating the ozone-containing gas by a process selected from an electrochemical process, a corona discharge process, and combination thereof.

15. The method of claim 3, further comprising the step of scavenging microorganisms in the agricultural product and oxidizing toxins on the agricultural product.

16. The method of claim 3, wherein the agricultural product is selected from feed for livestock and food for human consumption.

17. The method of claim 3, further comprising the step of generating the humid ozone-containing gas stream in an electrochemical cell.

* * * * *